United States Patent Office 3,044,258
Patented July 17, 1962

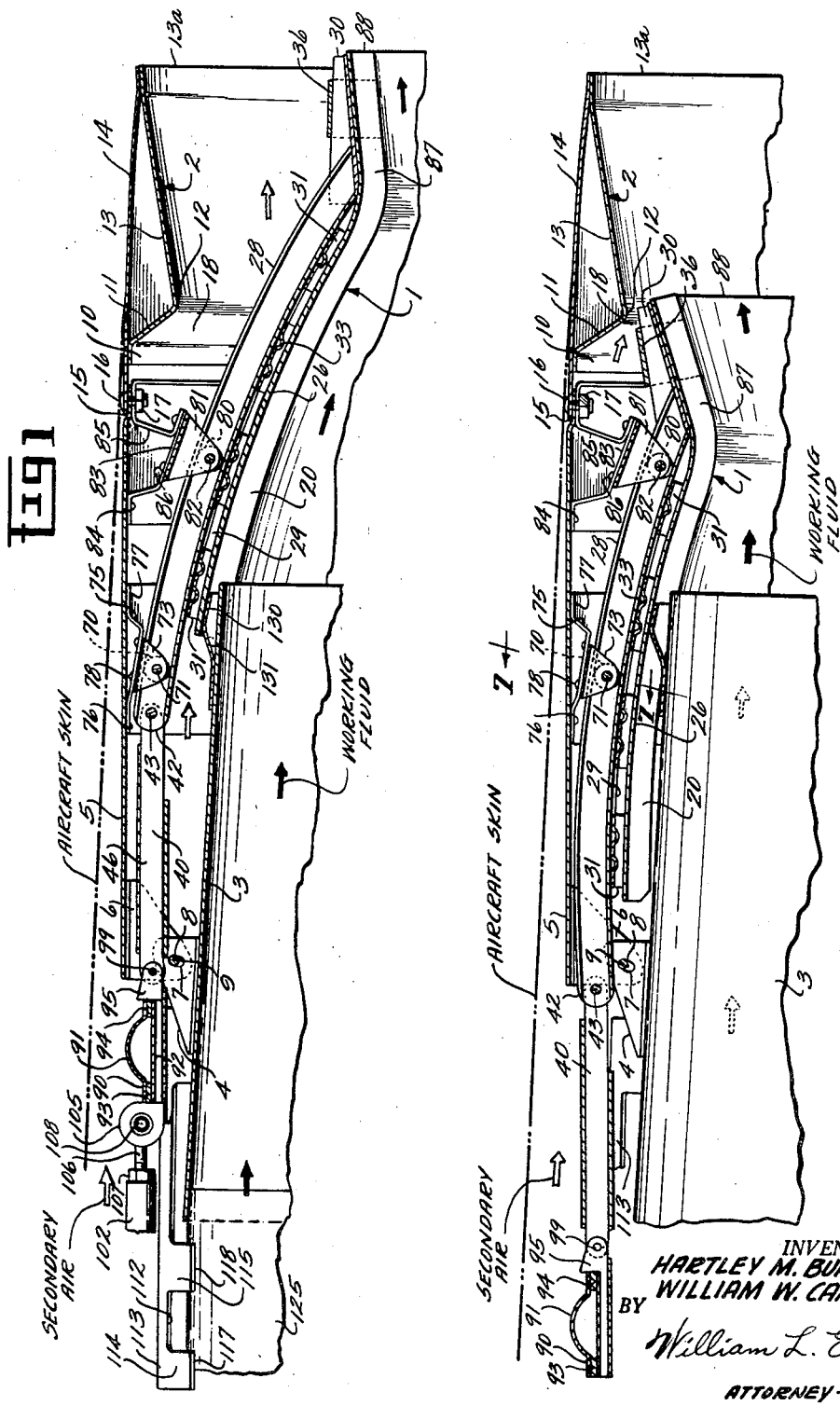

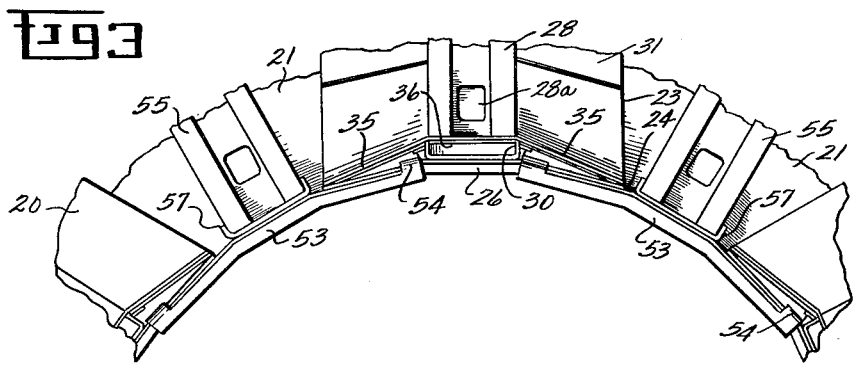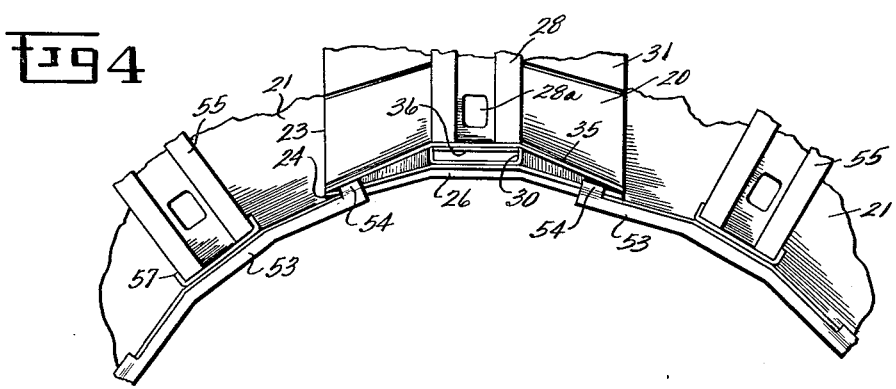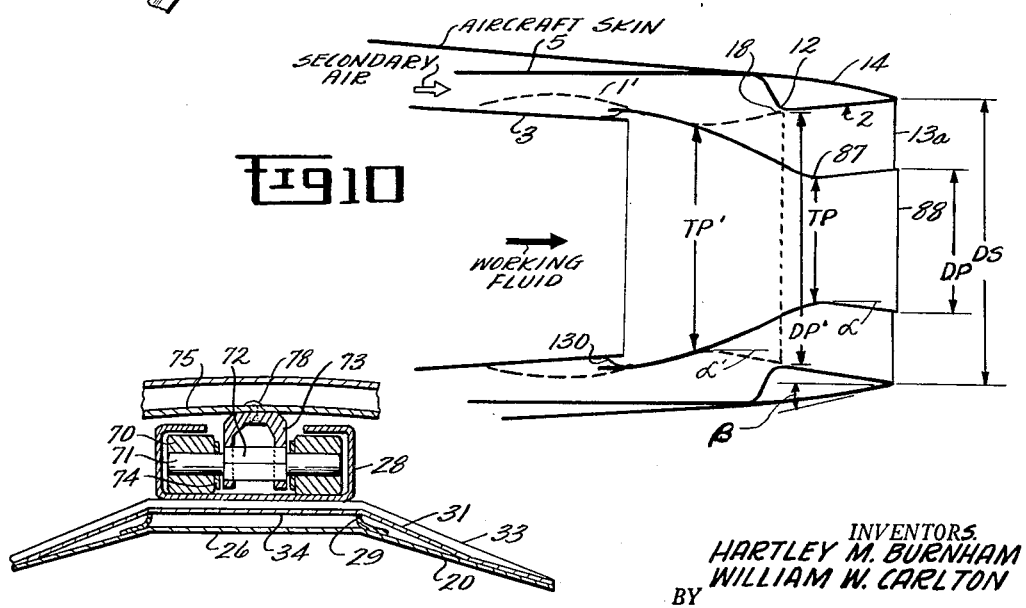

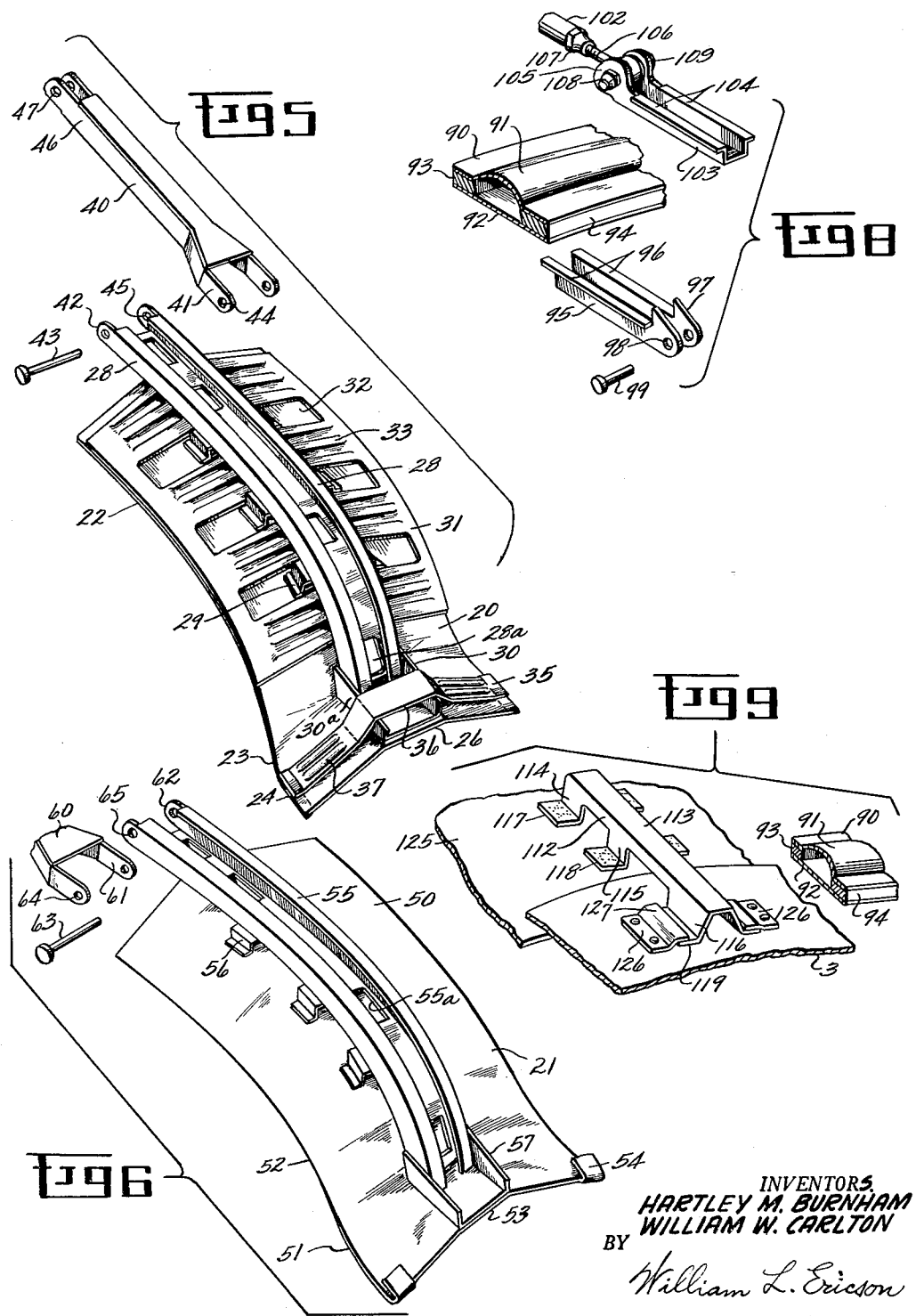

3,044,258
ADJUSTABLE CONVERGING-DIVERGING NOZZLE
William Wallace Carlton, Topsfield, and Hartley Morton Burnham, Reading, Mass., assignors to General Electric Company, a corporation of New York
Filed Nov. 25, 1958, Ser. No. 776,387
8 Claims. (Cl. 60—35.6)

Our invention relates to adjustable converging-diverging fluid nozzles, and in particular to adjustable jet exhaust nozzles for jet propulsion engines.

In the design of exhaust nozzles for jet propulsion engine applications, several inherent aerodynamic characteristics of fluid flow in nozzles must be taken into account. One of these relates to the nozzle throat area, which is determined by that portion of the nozzle having the minimum cross-sectional area. The throat area of the nozzle determines the mass flow rate of working fluid that can be passed through the nozzle at a given pressure ratio across the throat and a given temperature.

The maximum pressure ratio that can be attained across the throat portion of a nozzle is known as the critical pressure ratio. This condition occurs when the velocity of fluid flow through the throat reaches the velocity of sound in the working fluid passing through the nozzle. Any further increase in the pressure of the working fluid merely results in expansion of the fluid downstream of the throat to the ambient atmospheric pressure, the pressure ratio across the throat remaining at the critical level. It will be appreciated that when the critical pressure ratio across the nozzle throat is reached and exceeded, the mass flow rate through the nozzle is then only a function of fluid temperature, and throat area. It therefore becomes necessary to provide, in many engine applications, particularly those employing thrust augmentation systems, means for varying the throat area of the jet nozzle to efficiently accommodate the various mass flow rates and fluid states encountered over the range of operating conditions of the engine.

Another characteristic that must be considered in nozzles of this type involves the requirement for efficiently converting the available energy, stored in the working fluid to be discharged, into a useful thrust reaction force. An increase in the pressure of the working fluid such as to exceed the critical pressure ratio, relative to the ambient pressure of the atmosphere, will not produce any increase of the pressure ratio across the throat of the nozzle; that is, such an increase in pressure of the working fluid will produce very little further increase in the amount of useful energy, in the form of reaction thrust, extracted from the working fluid by expansion and conversion to velocity form in the nozzle throat. Working fluid having a pressure greater than the critical ratio can be expanded to ambient pressure only after leaving the nozzle throat.

It has been the general practice in the art to employ a purely convergent nozzle, that is, a nozzle radially converging in the direction of fluid flow toward a throat coinciding with its discharge orifice. Such a nozzle is adequate provided that the pressure of the working fluid is less than the critical value; however, when the pressure of the working fluid exceeds the critical value, the excess pressure produces no useful thrust, because the fluid cannot be expanded to ambient pressure in the throat of the nozzle. The excess pressure expands freely downstream of the nozzle, and produces no useful thrust reaction whatsoever upon the jet propulsion engine.

In order to obtain useful thrust from working fluid having a pressure far exceeding the critical ratio, as in turbojet engines designed for supersonic velocities, it has now become common practice to provide a diverging nozzle passage downstream of the nozzle throat. Nozzles of this type are generally known as "converging-diverging" nozzles, the nozzle passage being shaped in such a manner as to converge radially inwardly toward a throat portion, in the direction of flow of the working fluid, and then to diverge radially outwardly downstream of the throat to a discharge orifice. Such a nozzle can provide useful thrust from the complete expansion of working fluid from a pressure greater than the critical pressure ratio, down to ambient pressure. The excess pressure is converted into useful thrust in the divergent portion of the nozzle, by expansion to ambient pressure with concomitant conversion of pressure energy into a supersonic fluid velocity, to produce additional reaction thrust upon the nozzle.

A serious problem arises in connection with exhaust nozzles used with jet propulsion engines employing a wide range of pressure ratios above and below the critical value, as in those used to propel aircraft at supersonic as well as subsonic velocities. A purely convergent nozzle, as previously explained, cannot convert working fluid pressure in excess of that defined by the critical pressure ratio, into a useful thrust reaction. On the other hand, at subsonic velocities or low pressure ratios, a divergent nozzle portion tends to over-expand the working fluid below ambient atmospheric pressure, with a consequent drag or negative thrust induced upon the divergent portion. In order to resolve this conflct, it is desirable to minimize the amount of divergence of the divergent portion of a convergent-divergent nozzle when the pressure ratio of the working fluid is in the range of the critical value; and to increase the divergence of this portion as the pressure ratio increases well above the critical value.

Thus, in order to achieve maximum thrust reaction from working fluid whose pressure varies widely above and below the critical value, means should be provided for varying the degree of divergence of a convergent-divergent nozzle, as well as the area of the nozzle throat, in accordance with varying aerodynamic conditions of the working fluid in the nozzle. This can be achieved by providing a nozzle whose throat area and discharge orifice area are independently variable.

In practice, we have found that in order to provide a convergent-divergent exhaust nozzle which will provide satisfactory efficiency and maximum thrust reaction over the operating ranges discussed above, means may be provided to vary the cross-sectional area of the nozzle throat in accordance with the temperature of the working fluid, which varies greatly in an engine intermittently utilizing an afterburner; and further means may be provided to vary the cross-sectional area of the discharge orifice of the divergent portion of the nozzle, relative to the throat area, in accordance with the ratio of the pressure of the working fluid to ambient atmospheric pressure.

It is an object of this invention to provide a convergent-divergent jet exhaust nozzle comprising a single set of adjustable nozzle flaps of convergent-divergent form, whose throat area and discharge orifice area are jointly variable in a desired predetermined relationship, corresponding to varying flight conditions.

It is a further object of this invention to provide a convergen-divergent nozzle whose effective discharge orifice area, defined by the points of separation of working fluid from the divergent portions of the nozzle walls, is automatically variable in accordance with the pressure of the working fluid relative to atmospheric pressure.

It is a further object of this invention to provide a convergent-divergent jet exhaust nozzle whose throat area and discharge orifice area are jointly mechanically variable in a desired predetermined relationship corresponding to a range of varying flight conditions, and whose effective discharge orifice area is automatically variable to correspond to an increased range of flight conditions, in response to aerodynamic conditions in the nozzle and without further mechanical adjustment.

Further objects and advantages of the invention will be apparent from the following description.

Our invention generally comprises the combination with a convergent-divergent nozzle of an ejector nozzle passage spaced along the divergent portion of the nozzle, and a source of secondary air of subsonic velocity supplied to the ejector nozzle passage. The introduction of a subsonic flow between the working fluid and the divergent walls of the nozzle produces an automatic variation in the effective area of the discharge orifice, so that overexpansion is minimized under all conditions.

Our invention further generally comprises an annularly disposed set of nozzle flaps shaped to form a convergent-divergent nozzle, in combination with actuating means for adjusting the flaps along a predetermined curved path so as to vary the throat area and discharge orifice area of the nozzle in a predetermined relationship.

We further embody our invention in a combination of the previously mentioned features in which a primary nozzle section is formed of converging-diverging flaps and is adjustable by the actuating means to a range of positions in which a fixed secondary nozzle section forms a divergent extension of the primary nozzle section and defines an ejector nozzle passage therebetween, whereby the effective discharge orifice area is automatically variable in the manner described above.

For a better understanding of the invention, reference may be had to the accompanying drawings. Although only a single embodiment of our invention is shown and described as an example, many modifications and additional embodiments will occur to those skilled in the art. In the drawings:

FIG. 1 is a fragmentary longitudinal sectional view of an embodiment of our improved jet exhaust nozzle, showing the elements of the nozzle in a first or closed position;

FIG. 2 is a similar view, showing the elements of the nozzle in a second or open position;

FIG. 3 is a fragmentary end view of the nozzle, looking generally along the longitudinal axis thereof, and showing nozzle-forming elements of the nozzle in the first or closed position of FIG. 1;

FIG. 4 is a view similar to FIG. 3, showing the same elements of the nozzle in the second or open position of FIG. 2;

FIG. 5 is a pictorial representation of one of the nozzle-forming elements of FIGS. 3 and 4, together with members associated therewith;

FIG. 6 is a pictorial representation of another of the nozzle-forming elements of FIGS. 3 and 4, together with members associated therewith;

FIG. 7 is a fragmentary transverse sectional view taken along line 7—7 in FIG. 2, looking in the direction of the arrows;

FIG. 8 is a fragmentary pictorial view of certain nozzle-actuating elements shown in FIGS. 1 and 2;

FIG. 9 is a fragmentary pictorial view of certain supporting elements shown in FIGS. 1 and 2;

FIG. 10 is a diagrammatic representation of the nozzle, shown in the first or closed position of FIG. 1 in solid lines, and in the second or open position of FIG. 2 in dotted lines.

Referring to FIG. 1, our improved jet exhaust nozzle includes an adjustable primary nozzle section generally designated 1, and a fixed secondary nozzle section, generally designated 2. These nozzle sections define fluid passageways receiving a flow of working fluid, designated by black arrows, from a jet propulsion engine of any suitable type, through an exhaust collector 3 of cylindrical form. The exhaust collector is of a conventional type well known in the art, and will not be further described. The working fluid is passed to the exhaust nozzle by the exhaust collector 3 for the conversion of pressure and temperature energy internally contained therein into a kinetic or velocity form in the exhaust nozzle, thereby generating a useful thrust reaction upon the exhaust nozzle. The jet propulsion engine, exhaust nozzle, and exhaust collector are generally enclosed by an aircraft "skin," designated by a broken line, in order to minimize the resistance of the atmosphere to their passage therethrough. The aircraft skin may follow any form suitable to specific aircraft applications, as is well known to those skilled in the art, and is therefore only schematically indicated.

The exhaust nozzle structure is supported by the exhaust collector 3, by means of a plurality of brackets 4 circumferentially spaced about and welded or otherwise suitably secured to the exhaust collector. One such bracket 4 is shown in FIG. 1. A cylindrical supporting duct 5 is radially spaced about the exhaust collector and extends axially therefrom. The supporting duct is welded or otherwise suitably secured to a plurality of brackets 6 circumferentially spaced about its inner surface at the upstream end thereof. One such bracket 6 is seen in FIG. 1. In order to provide for relative thermal expansion of the supporting duct 5 and the exhaust collector 3 in a radial direction, each of brackets 6 is connected to one of brackets 4 by means of enlarged elliptical openings 7 formed in each of brackets 4, openings 8 formed in each of brackets 6, and a rivet or other suitable fastener 9, passing through openings 7 and 8.

Secondary nozzle section 2 is formed as an annulus of sheet metal, including a flange 10, a converging portion 11, a throat portion 12, and a diverging portion 13 terminating in a secondary discharge orifice 13a. Nozzle section 2 is radially spaced about nozzle section 1, and is secured to supporting duct 5 by means of an annular fairing or duct extension 14. Nozzle section 2 is secured circumferentially within duct extension 14 by spot welding or other suitable fastening means, about flange 10 and in the region of secondary discharge orifice 13a. The upstream edge of duct extension 14 overlies a necked-down end portion 15 of supporting duct 5, and is secured thereto by a plurality of bolts 16 and nuts 17 circumferentially spaced thereabout.

Secondary nozzle section 2 cooperates with the outer surfaces of adjustable primary nozzle section 1 to form an adjustable ejector nozzle passage 18, which is supplied with secondary air, designated by white arrows, through the annular passages defined by the radial spacing between exhaust collector 3 and the outer surfaces of nozzle section 1, and supporting duct 5.

Secondary air may be supplied to ejector nozzle passage 18 from any suitable source; we prefer to employ air received at the intake end of the associated jet propulsion engine (not shown). The ejector nozzle serves to draw this air into the exhaust stream through throat 12, in a manner well known in the art.

In order to more clearly illustrate the construction of adjustable primary nozzle section 1, which is shown in assembled relation in FIGS. 3 and 4, reference may now be had to FIGS. 5 and 6. The primary nozzle section is comprised of an annularly disposed set of circumferentially overlapping nozzle flaps, which are relatively slidable. We prefer to employ two diverse types of alternately arranged flaps for this purpose, including outer flaps 20, one of which is shown in FIG. 5, and inner flaps 21, one of which is shown in FIG. 6. Referring to FIG. 5, outer flaps 20 are formed of sheet metal, drawn or otherwise suitably formed with a reverse longitudinal curvature to form a convergent portion 22, a throat portion 23, and a divergent portion 24 whose termination cooperates to form a primary discharge orifice in the assembled nozzle. In order to provide for the necessary curvature in the circumferential direction in the assembled primary nozzle section, flaps 20 are formed with a raised center section 26, such that the raised section extends longitudinally along the flap.

In order to provide for the support of flaps 20 and for their actuation in a desired path, a track element 28 is secured to each of these flaps. Track element 28 is formed as a partially closed box-section beam, and is curved in a manner corresponding to any desired variable relationship of the dimensions of the primary nozzle section. The track element is formed with openings 28a to lighten the structure. In order to secure track elements 28 to flap 20, and to afford structural rigidity, the track element is secured to the flap along convergent portion 22 by means of a plurality of flanged bracket members 29, and along divergent section 24 by means of a flanged bracket member 30. Bracket members 29 and 30 are welded or otherwise suitably secured to flap 20 along longitudinal raised section 26, and are similarly secured to track element 28.

In order to lend structural rigidity to flap 20, there is provided a stiffening plate 31, having lateral edges congruent with those of flap 20, spot welded or otherwise suitably secured thereto. Stiffening plate 31 is provided with a plurality of openings 32 to lighten the structure and to accommodate flanged bracket members 29. The stiffening plate is also formed with a series of parallel transverse ribs 33 to increase the rigidity of the structure.

As illustrated in the sectional view of FIG. 7, stiffening plate 31 is formed with a raised central section 34 extending longitudinally thereover, and is so formed as to stand up from raised section 26 of flap 20 in assembled relation therewith, thereby increasing the stiffness of the flap unit. Ribs 33 abut the lower surface of tract element 28 along raised section 34, and are spot welded thereto along this surface.

Referring to FIG. 5 again, means for stiffening the divergent portion 24 of flap 20 are also provided, comprising a transverse strap member 35 whose edges are laterally congruent with the edges of the flap, and are welded thereto. Strap member 35 is formed with a raised center section 36 overlying the flanges 30a of bracket member 30, and is welded thereto along the abutting surfaces. The strap member is also formed with transverse stiffening ribs 37, so as to afford increased structural rigidity to the lateral edges of divergent portion 24 of the flap.

In order to provide for the actuation of flap 20, a linkage member 40 is provided for each such flap. Linkage member 40 is bifurcated to form tongues 41 for connection with tongues 42 formed in track element 28. Member 40 and track element 28 are drivingly connected by means of a pin 43 passed through suitably formed openings 44 and 45 formed in tongues 41 and 42, respectively. Linkage member 40 is formed at its opposite end with bifurcated tongues 46 having openings 47, for driving connection with suitable actuating means.

Referring now to FIG. 6, inner flaps 21 are of similar configuration to outer flaps 20, except that they are made of a substantially more flexible structure. Flaps 21 are similarly formed of sheet metal, but this material is preferably of somewhat lighter gauge and stiffness than that employed in outer flaps 20. By making flaps 21 relatively flexible, advantage may be taken of the gas pressures existing interiorly of the nozzle under operating conditions to produce conformity of flaps 21 with the interior surfaces of the edges of flaps 20, so that positive sealing action between adjacent flaps results. Furthermore, flaps 21 may thus be made of relatively light and flexible construction without sacrifice of effective rigidity of the primary nozzle section as a whole.

Flap 21 is similarly formed with a convergent portion 50, a throat portion 52, and a divergent portion 51, whose termination cooperates with the termination of flaps 20 to form a primary discharge orifice in the assembled nozzle. Flap 21 is formed with a raised center section 53, extending longitudinally over the flap. In order to provide for sliding cooperation of flaps 21 and 20, and to provide for a closed fluid passageway in the nozzle assembly, flap 21 is provided with reverse tongues 54 extending from the downstream end of the flap at its transverse edges. Tongues 54 slidingly receive the downstream terminations of flaps 20 thereunder in the assembled nozzle, and serve to maintain radially abutting relation of the downstream terminations of adjacent flaps, while permitting relative circumferential sliding during adjustment of the primary nozzle section.

Each flap 21 is also provided with a track element 55, which is curved similarly to track element 28, and is also formed on a partially enclosed box-section beam. Track element 55 may be formed with lightening holes 55a to minimize weight. The track element is secured to raised section 53 of the flap by means of flanged bracket members 56 positioned along convergent portion 50 of the flap, and a flanged bracket member 57 spaced along divergent portion 52. These bracket members are spot welded or otherwise suitably secured along their surfaces of abutment with the track member and the flap, respectively.

A linkage member 60 is provided to actuate each flap 21, and is formed with tongues 61 for cooperation with tongues 62 formed in the adjoining end of track member 55. Linkage member 60 and track member 55 are drivingly connected by means of a pin 63 passed through suitable openings 64 and 65 formed in tongues 61 and 62, respectively.

The cooperation of outer flaps 20 and inner flaps 21 in the assembled primary nozzle section can be seen by reference to FIGS. 3 and 4, respectively showing the primary nozzle section in the closed position of FIG. 1, and in the open position of FIG. 2. It will be seen that flaps 21 underlie flaps 20 with a circumferential overlapping, and that reverse tongues 54 of flaps 21 sliding engage the downstream edges of flaps 20 adjacent thereto. Relative circumferential movement of adjacent flaps is thus limited to the illustrated positions as limits, due to the abutment of reverse tongues 54 upon bracket members 30 as one limit, and upon straps 35, welded to the edges of flaps 20, as the other limit. It should be noted that while rigid convergent-divergent flaps could not theoretically interfit in sliding engagement to form a fully closed passage in this manner, the flexibility of flaps 21 permits this desired result.

Sliding adjustment of flaps 20 and 21 is achieved by the cooperation of rollers, secured to the duct extension 5, with track elements 28 and 55 of the flaps. The rollers are best illustrated in FIGS. 1, 2, and 7. Two sets of rollers are provided for cooperation with each track element, so that each flap is adjustable along a path defined by its own curvature and by the positions of the axes of rotation of the two sets of rollers.

Referring first to FIG. 7, one such set of rollers 70 is shown in cooperation with track element 28 of a flap 20. Rollers 70 are of such diameter as to cooperate in rolling engagement with the internal surfaces of track element 28 with a minimum of transverse "play." Each set of rollers 70 is secured to the ends of an axle pin 71, which is rotatably mounted in a split bearing element 72. The bearing element is mounted in a carriage frame 73, which thus supports track element 28 in rolling engagement with rollers 70. In order to minimize rubbing friction rollers 70 with carriage frame 73, anti-friction washers 74 are interposed between these members about axle pin 71. The anti-friction washers may be of any suitable material having a low coefficient of friction.

Means are provided for the support of carriage frames 73, comprising an annular supporting ring 75, also shown in FIG. 1. Ring 75 is of frustoconical form, and is provided with cylindrical flanges 76 and 77 for circumferential abutment upon the inner surface of duct extension 5. Flanges 76 and 77 are spot welded or otherwise suitably secured to the duct extension for the support of carriage frames 73 in spaced relation thereto. Each carriage frame 73 is secured to supporting ring 75 by means of rivets 78, or other suitable fasteners. A carriage frame 73 and associated rollers 70 are provided for each track element 28 and 55, associated with flaps 20 and 21, respectively, and the carriage frames are circumferentially spaced about supporting ring 75 to accommodate the desired number of flaps in the primary nozzle section.

As shown in FIG. 1, a second set of rollers 80, supported in a carriage frame 81 by means of an axle 82, is provided for each track element 28 or 55. Rollers 80 are arranged rearwardly of rollers 70, and the relative positions of axles 71 and 82, together with the form of curvature of track elements 28 and 55, determine the paths of motion of flaps 20 and 21, respectively. Carriage frames 81 are supported by a supporting ring 83, which is fabricated from a first flanged annular ring 84 and a second flanged annular ring 85, which are welded or otherwise suitably joined. Rings 84 and 85 are spot welded about their surfaces of circumferential abutment upon the inner surface of duct extension 5, to support carriage frames 81 in spaced relation thereto. Carriage frames 81 are spaced about supporting ring 83 to support track elements 28 and 55 in circumferentially spaced relation, and are secured to the supporting ring by means of rivets or other fasteners 86. In the embodiment shown, annular ring element 85 circumferentially abuts the inner surface of necked-down portion 15 of duct extension 5, and is further fastened by means of bolts 16 and nuts 17.

It will be seen that rollers 70 and 80 support flaps 20 and 21 for movement along paths defined by the location of their axles and by the curvature of track elements 28 and 55, respectively, between the closed position of FIGS. 1 and 3, and the open position of FIGS. 2 and 4, as limits. In assembly, flaps 20 and 21 cooperate to form an adjustable convergent-divergent primary nozzle section including a throat portion 87 and a primary discharge orifice 88.

Actuating means for selectively adjusting the positions of flaps 20 and 21 are provided, as shown in FIGS. 1 and 8. As previously described, a linkage member 40 is drivingly connected with each track element 28, and a similar linkage member 60 is drivingly connected with each track element 55. In order to actuate the linkage members and track elements in unison, a driving ring 90 is utilized. Driving ring 90 is formed of a pair of concentric ring members 91 and 92 circumferentially joined by a pair of annular elements 93 and 94, by welding or other suitable fastening means. Ring member 91 is toroidally formed about its periphery, and the resulting structure of driving ring 90 achieves maximum rigidity with a minimum of weight.

Driving ring 90 is drivingly connected with each of linkage members 40 and 60 by means of a plurality of channel brackets 95, best seen in FIG. 8. Channel brackets 95 are provided with transverse flanges 96, which abut the inner circumferential surface of driving ring 90, and are welded thereto. One of channel brackets 95 is provided for each linkage member 40 or 60, and the channel brackets are circumferentially spaced about the inner surface of driving ring 90 for cooperation with the linkage members. As previously described, each of linkage members 40 is provided with tongues 46, formed with openings 47. Channel brackets 95 are formed with tongues 97 for connection with tongues 46. One of channel brackets 95 is drivingly connected with each linkage member 40 by a rivet 99, or other suitable fastener, passing through holes 47 and 98 formed in tongues 46 and 97, respectively. One of channel brackets 95 is similarly drivingly connected with each linkage member 60. In this manner, the driving ring 90 is drivingly connected through the linkage provided with each flap 20 and 21, for movement of these flaps in unison.

In order to actuate driving ring 90 for the adjustment of flaps 20 and 21, a plurality of actuating motors (not shown) of any suitable type are provided. Any desired number of actuating motors may be employed, but it is found desirable in practice to provide three or more, in order to actuate driving ring 90 uniformly parallel to its major axis, without any tendency to tilt. A drive rod 102 extends from each actuating motor. In order to provide for actuation of driving ring 90 by means of drive rods 102, a channel bracket 103 is provided for each drive rod. Channel bracket 103 is formed with transverse flanges 104, which are secured to driving ring 90 upon its inner circumference by welding. Channel bracket 103 is further formed with a pair of ears 105 for connection with a drive rod 102. Connection is made by means of an eye bolt 106, which is threaded into a tapped hole formed in the end of drive rod 102, to permit adjustment of the linkage. Eye bolt 106 is secured in an adjusted position relative to drive rod 102 by means of a nut 107 threaded on the eye bolt and jammed against the drive rod. Connection of the eye bolt to ears 105 of channel bracket 103 is achieved by means of a nut 108 and a bolt 109, passing through the eye and through holes (not shown) suitably formed in the ears.

Referring to FIG. 9, means are provided for slidably supporting driving ring 90 in a position concentric with exhaust collector 3 and with the nozzle structure. These means comprise a plurality of slide elements 112 circumferentially spaced about the casing and exhaust collector 3. Each slide element 112 is formed with an elongated plane surface 113 for sliding cooperation with the inner circumference of driving ring 90, formed by ring element 92. Slide element 112 is formed with pairs of upstanding legs 114, 115, and 116, which are formed at their ends with transverse flanges 117, 118, and 119, respectively, for supporting the slide element 112 on the jet engine casing and exhaust collector 3. In the embodiment shown, the upstream edge of the exhaust collector 3 circumferentially overlies the downstream end of the concentrically associated jet engine casing 125, and is fastened thereto by suitable means (not shown). The slide elements 112 are of such dimensions that their plane surfaces 113 slidingly abut the inner circumference of driving ring 90, over the range of longitudinal movement of the driving ring between the positions of FIG. 1 and FIG. 2. Transverse flanges 117 and 118 of slide elements 112 rest upon the outer surface of engine casing 125 in the configuration shown, and are spot welded or otherwise suitably secured thereto. Transverse flanges 119 of each slide element 112 rest upon the outer surface of exhaust collector 3, and are slidably secured thereto, in order to facilitate removal of the exhaust collector from the jet engine casing. This slidable connection comprises a pair of slide pads 126, which are spot welded or otherwise suitably secured to the surface of exhaust collector 3. The slide pads are provided with bent up slide-forming portions 127, which slidably receive transverse flanges 119 of the slide element. Driving ring 90 is thus positioned concentrically about exhaust collector 3, and supported for longitudinal sliding motion, by elements 112.

Means have now been described by which the primary nozzle section, comprising a plurality of flaps 20 and 21, may be adjusted over a path defined by the positions of rollers 70 and 80 and by the curvature of track elements 28 and 55, between the closed position of FIG. 1 and the open position of FIG. 2. Any suitable control system may be employed to operate the actuating means in accordance with a desired program of adjustment of the primary nozzle section.

In order to provide for the sealing of the working fluid passage defined by exhaust collector 3 and primary nozzle section 1 from secondary air ejector nozzle passage 18, in all adjusted positions of the primary nozzle section, a sliding seal 130, shown in FIGS. 1 and 2, is employed. Seal 130 is formed as an annulus having a central frustoconical portion 131, and engages the outer end surface of exhaust collector 3, and the inner surface of flaps 20 and 21. The seal is welded or otherwise suitably secured to exhaust collector 3, and slidingly engages flaps 20 and 21 in fluid-sealing relation. The seal is formed of flexible material, so that the differential in pressure of the working fluid over the secondary air acts upon frustoconical portion 131 to urge the seal outwardly into uniformly tight sealing engagement with the flaps.

Operation

In order to describe the operation of our improved jet exhaust nozzle, reference will be made to the diagrammatic illustration of FIG. 10. In this figure, primary nozzle section 1 is shown in solid lines in the closed position of FIGS. 1 and 3, and in dotted lines in the open position of FIGS. 2 and 4. The primary nozzle section is numbered with prime superscripts in the open position. For convenience, the following designations of diameters are made to indicate the cross-sectional areas of various parts of the nozzle:

TP represents the diameter of the throat portion 87 of primary nozzle section 1, in the closed position.
DP represents the diameter of the primary discharge orifice 88 of primary nozzle section 1 in the closed position.
$\alpha$ represents the angle of divergence of the divergent portion of primary nozzle section 1, in the closed position.
TP' represents the diameter of the throat portion 87' of primary nozzle section 1', in the open position.
DP' represents the diameter of the primary discharge orifice 88' of primary nozzle section 1', in the open position.
$\alpha'$ represents the angle of divergence of the divergent portion of primary nozzle section 1', in the open position.
DS represents the diameter of the secondary discharge orifice 13a of secondary nozzle section 2, which is fixed.

It should be understood that the extreme open and extreme closed positions of the primary nozzle section 1 are selected for simplicity of illustration, and that positions intermediate of these extremes will be employed under flight conditions intermediate those which will now be described; and that modulation of the positions of the primary nozzle section should preferably be provided for to accommodate varying flight conditions.

It should also be understood that in the extreme open and extreme closed positions of the embodiment of the primary nozzle section illustrated, the dimensions of the throat portion 87, first discharge orifice portion 88, and the angle of divergence $\alpha$ also attain their extreme limits. However, the relative rates of change of these dimensions, as the primary nozzle section is adjusted intermediate the extreme positions, may be predetermined by appropriately establishing the form of curvature of track elements 28 and 55, and by appropriate positioning of roller elements 70 and 80 relative thereto.

Low Pressure, Closed Nozzle Operation

The closed position of primary nozzle section 1 is employed when the pressure of the working fluid is at a minimum, corresponding to a condition in which no afterburning is taking place. The throat area defined by diameter TP is at a minimum under these conditions. The pressure of the working fluid relative to atmospheric pressure is relatively low, having a value of the order of two to four atmospheres, corresponding generally to subsonic flight speeds. Optimum propulsive efficiency of the nozzle can be achieved with a primary discharge orifice only slightly larger than the throat section under these conditions; therefore, the angle of divergence $\alpha$ should be reduced to a small value, so that the ratio of the primary discharge orifice area at DP to the area of the nozzle throat at TP can be close to unity, in order to prevent over-expansion of the working fluid below atmospheric pressure. Such an embodiment of our improved nozzle is practicable and could be achieved by relocating the roller and track elements. However, we have found in practice that a sufficiently close approach to the ideal is achieved by limiting the movement of the nozzle to the closed position shown.

In the closed position of primary nozzle section 1, the primary discharge orifice 88 is located substantially in the plane of the secondary discharge orifice 13a of secondary nozzle section 2, so that very little ejector action takes place from interaction of the working fluid and the secondary air in ejector nozzle passage 18. In the plane of the discharge orifices, the working fluid has been expanded substantially to atmospheric pressure, at which pressure it will remain if not allowed to expand further into the larger region behind the fixed secondary exit, DS. The low-velocity secondary air fills the annular gap or "base" and separates the working fluid flow from the atmospheric air stream passing over the secondary exit, and thus minimizes over-expansion of the working fluid or the outer atmospheric stream downstream of the primary discharge orifice, which could result in drag or negative thrust. The presence of the low velocity secondary airstream permits the transmission of atmospheric pressure into the "base" area, thus preventing over-expansion of the working fluid below atmospheric pressure in this area.

The downstream end of duct extension 14, which forms an extension of the aircraft skin, is formed with a gradually convergent "boat-tail" angle $\beta$; this causes atmospheric air to converge upon the exhaust stream in such manner as to cooperate with the location of the primary discharge orifice in the plane of the secondary discharge orifice so as to reduce mixing and consequent acceleration of the secondary low speed airstream.

Intermediate Pressure, Open Nozzle Operation

If the pressure of the working fluid is increased as by increased injection of fuel, the primary nozzle section is moved toward the fully opened position 1'. In this position, the secondary nozzle section cooperates with the divergent portion of the primary nozzle section to form an extended divergent portion of the exhaust nozzle, the ejector nozzle passage being spaced along the extended divergent portion. The primary nozzle section cooperates with the secondary nozzle section and with the secondary air ejector nozzle passage 18, spaced along the extended divergent portion of the exhaust nozzle, to provide an automatic variation of effective discharge orifice area, in response to the ratio of the working fluid pressure to atmospheric pressure.

When the pressure of the working fluid exceeds the critical value and reaches the order of 3 to 5 atmospheres, the divergent portion of primary nozzle section 1' then acts to expand the pressure of the working fluid in excess of the critical value to approximately atmospheric pressure, increasing the velocity of the working fluid to a supersonic value necessary for efficient operation of the engine. In this flight range the divergent portion of the primary nozzle section should be so positioned that its length, divergence, and discharge orifice area are effective to expand the fluid to the desired conditions, and the secondary divergent nozzle section 2 should be made inoperative to expand the working fluid further; that is, the primary discharge orifice area DP' bears the appropriate relation to the throat area TP' for most efficient propulsion and maximum thrust under these flight conditions. We accomplish this result by placing ejector nozzle passage 18 intermediate the throat 87' and the secondary discharge orifice 13a of the secondary nozzle section. We have found that the desired ineffectuality of the secondary nozzle section results from this placement, at the pressure ratios and flight speeds under consideration; the secondary air flow enables the working fluid to separate from the nozzle walls at the primary discharge orifice 88' of the primary nozzle section. Thus, the working fluid stream does not substantially diverge to follow the walls of the secondary nozzle section, which is thereby rendered ineffectual to overexpand the fluid under these flight conditions.

The theory of separation of working fluid flowing at supersonic velocities from the walls of a divergent nozzle is not fully understood. These principles are discussed in "Boundary Layer Theory," Dr. Hermann Schlichting, McGraw-Hill, New York (1955). However, it is known that separation can occur if atmospheric air pressure can be transmitted interiorly of the nozzle walls upstream to a point at which the working fluid has reached atmospheric pressure, so that an equilibrium condition is achieved. Atmospheric pressure cannot be transmitted in this manner through a supersonic boundary layer. Thus, it is necessary to provide a subsonic flow along the divergent walls to permit the transmission of atmospheric pressure into the boundary layer. Without the introduction of a subsonic flow in these regions, the supersonic velocity working fluid will continue to expand and increase in velocity until it reaches the discharge orifice of the nozzle, reaching a sub-atmospheric pressure and consequently producing a drag upon the engine. Our provision of a flow of subsonic velocity secondary air into the boundary layer of the working fluid permits atmospheric pressure to be transmitted upstream to a point of equilibrium at which the working fluid has achieved substantially atmospheric pressure, and causes the flow of working fluid to separate from the walls of the nozzle at this point without significant overexpansion downstream thereof.

Merely introducing the secondary flow is not enough to assure this desired result, however, as prior art on ejector-type nozzles has shown. The secondary air must be maintained at subsonic velocity until it reaches atmospheric pressure in the downstream flow, providing a continuous avenue for atmospheric pressure to be transmitted upstream to the excess divergent wall area downstream of the area of separation of the working fluid therefrom. The high-speed working fluid flow stream and atmospheric airstream adjacent to the secondary air stream tend to accelerate it by viscous mixing. This mixing must be prevented or limited. By placing a secondary air ejector nozzle passage along the divergent portion of the nozzle, we reduce the portion of the nozzle length in which mixing and acceleration of the low velocity secondary air can take place. We have also found that a smaller gap can be used for the ejector nozzle passage, with consequently improved performance at higher working fluid pressure ratios when the entire divergent section is filled with supersonic velocity working fluid.

*High Pressure, Open Nozzle Operation*

If the flight speed is now to be increased to a value materially in excess of sonic velocity, or increased acceleration is desired, the pressure of the working fluid is increased by increased ram pressure in the air supplied to the engine. As a velocity of Mach 2 is approached, we have found in practice that the pressure of the working fluid may reach a value of the order of 10 to 15 atmospheres. At these increased flight velocities and working fluid pressures, the divergent portion of the primary nozzle section is no longer adequate to expand the working fluid to substantially atmospheric pressure, and an increased ratio of discharge orifice area to throat area is necessary. The working fluid retains some excess pressure as it leaves the primary nozzle section, and therefore tends to continue to expand and decrease in static pressure in the secondary nozzle section 2, and to follow the walls thereof to the secondary discharge orifice 13a. The excess working fluid pressure remaining in the working fluid at the primary discharge orifice 88' of the primary nozzle section 1' is of a sufficiently high value to prevent the separation effect at the primary discharge orifice which occurs at lower velocities and pressure ratios. The excess pressure remaining in the working fluid at the primary discharge orifice is such as to produce back pressure upon the secondary air in the ejector nozzle, such that the secondary air acts as a thrust-transmitting medium over the gap between the primary nozzle section and the secondary nozzle section. Because of this effect, we have found that there is no sudden overexpansion of the working fluid as it leaves the primary discharge orifice 88' to follow the walls of the secondary nozzle section, and that there is only a slight loss in thrust as compared with a unitary smooth-walled divergent nozzle portion.

At such times as a pressure ratio of the working fluid to the atmosphere, between the maximum just described and the intermediate ratios previously described, is employed, the working fluid may reach atmospheric pressure at a point spaced between the primary and secondary discharge orifices DP' and DS. Under these conditions, a desirable intermediate separation effect occurs in our improved nozzle.

Some excess pressure above atmospheric pressure remains in the working fluid after leaving primary discharge orifice 88', and the fluid continues to expand for some distance along the walls of secondary nozzle portion 2, reacting against the secondary air flowing from ejector nozzle passage 18. At a point at which an equilibrium pressure condition is achieved between the working fluid pressure and atmospheric pressure transmitted upstream through the subsonic secondary air flow, separation of the working fluid from the divergent walls of the secondary nozzle section occurs. The working fluid flows downstream without further expansion below atmospheric pressure, and the secondary air fills the divergent space circumferentially separating the flow of working fluid from the walls of the secondary nozzle section downstream thereof. The point of separation is determined by equilibrium pressure, and may occur anywhere between the primary and secondary discharge orifices. The optimum discharge orifice area is thus automatically maintained for varying flight conditions, without mechanical adjustment.

From the foregoing description, it will be apparent that we have provided a convergent-divergent jet exhaust nozzle whose throat area and discharge orifice area are jointly variable in a desired relationship corresponding to a wide range of subsonic and supersonic flight conditions, but which incorporates only a single set of movable nozzle elements. This result is obtained by providing for the variation of these areas in part by mechanical means, and in part by automatic aerodynamic effects.

It should be understood that these objectives may be achieved over more limited ranges of flight conditions by separately employing the subcombination of an adjustable convergent-divergent primary nozzle section, or the subcombination of a stationary primary convergent-divergent nozzle section and a secondary divergent nozzle section, together with an ejector nozzle passage disposed intermediate these sections. In order to provide an exhaust nozzle which is efficient over a maximum range of subsonic and supersonic flight conditions, however, we prefer to employ the combination of the complete exhaust nozzle which has been described.

It should be understood that the invention is not limited to specific details of construction and arrangement herein illustrated, and that changes and modifications may occur to one skilled in the art without departing from the spirit and scope of the invention.

What we claim as new and desire to secure by Letters Patent of the United States is:

1. An exhaust nozzle for a reaction engine, comprising: a primary nozzle section for receiving working fluid from said engine and formed successively, in the direction of working fluid flow therethrough, with a convergent portion, a throat portion, and a divergent portion; a secondary divergent nozzle section; means supporting said primary nozzle section for movement to a first position in which said working fluid is exhausted to atmosphere directly from said primary nozzle section, and to a second position in which said working fluid is exhausted to atmosphere through said secondary nozzle section from said primary nozzle section; whereby said secondary nozzle section forms a divergent extension of said divergent portion of said primary nozzle section in said second position.

2. An exhaust nozzle for a jet propulsion engine, comprising: a primary nozzle section receiving working fluid from said engine and formed successively, in the direction of working fluid flow therethrough, with a convergent portion, a throat portion, and a divergent portion; a secondary divergent nozzle section circumferentially spaced about said primary nozzle section and forming an ejector nozzle passage therebetween; a source of secondary air constructed and arranged to deliver said air to secondary nozzle section through said ejector nozzle passage; means supporting said primary nozzle section for movement to a first position in which said working fluid is exhausted to atmosphere directly from said primary nozzle section, and to a second position in which said working fluid is exhausted to atmosphere through said secondary nozzle section from said primary nozzle section; whereby said secondary nozzle section cooperates with said ejector nozzle passage in said second position to form a divergent extension of said divergent portion of said primary nozzle section, such that the effective area of discharge of working fluid from said secondary nozzle section is automatically varied to maintain equilibrium between the pressures of the discharged working fluid at the area of discharge thereof and the ambient atmosphere.

3. An exhaust nozzle as recited in claim 2, together with a fairing circumferentially spaced about said exhaust nozzle for directing atmospheric air about said engine, said fairing converging rearwardly to direct atmospheric air radially inwardly toward said flow of working fluid exhausted from said nozzle, whereby overexpansion of said working fluid induced by the circumferential spacing of said secondary nozzle section about said primary nozzle section is reduced.

4. In an exhaust nozzle for a jet propulsion engine: a set of annularly disposed relatively movable flaps shaped to form a primary nozzle section receiving working fluid from said engine, and formed successively, in the direction of working fluid flow therethrough, with a convergent portion, a throat portion, and a divergent portion; a secondary divergent nozzle section circumferentially spaced about said primary nozzle section and forming an ejector nozzle passage therebetween; a source of secondary air constructed and arranged to deliver said air to said secondary nozzle section through said ejector nozzle passage; means supporting said flaps for movement along predetermined curved paths to a first position in which said working fluid is exhausted to atmosphere directly from said primary nozzle section, and to a second position in which said working fluid is exhausted to atmosphere through said secondary nozzle section from said primary nozzle section; whereby said secondary nozzle section cooperates with said ejector nozzle passage in said second position to form a divergent extension of said divergent portion of said primary nozzle section, such that the effective area of discharge of working fluid from said secondary nozzle section is automatically varied to maintain equilibrium between the pressure of the discharged working fluid and the ambient atmosphere.

5. In an exhaust nozzle for a jet propulsion engine: a set of annularly disposed relatively movable flaps shaped to form an adjustable primary nozzle section adapted and arranged to receive working fluid from said engine, said flaps forming successively, in the direction of working fluid flow through said primary nozzle section, a convergent portion, a throat, a first divergent portion, and a primary discharge orifice; a plurality of track elements each affixed to one of said flaps and formed with a predetermined curvature longitudinally of said flap; roller means supporting said track elements for adjustable movement along curved paths conforming with said predetermined curvature to vary the cross-sectional areas of said throat and said primary discharge orifice; a fixed secondary nozzle section formed with a second divergent portion and with a secondary discharge orifice, and spaced radially about said primary nozzle section to form an ejector nozzle passage therebetween for supplying secondary air to said secondary nozzle section; said ejector nozzle passage and said secondary nozzle section cooperating in at least one position of said flaps along said paths to form a divergent extension of said primary nozzle section, such that the effective area of discharge of working fluid from said secondary nozzle section is automatically varied to maintain equilibrium between the pressures of the discharged working fluid and the ambient atmosphere.

6. An exhaust nozzle for a jet propulsion engine comprising an adjustable primary nozzle section receiving working fluid from said engine and formed successively in the direction of working fluid flow therethrough with a convergent portion, a throat portion and a downstream divergent portion, said primary nozzle section being adjustable to vary the form and cross-sectional area thereof, means adjustably supporting said primary nozzle section for movement axially and transversely between an extended downstream position and retracted upstream position, wherein the angle of divergency of said divergent portion and the area of said throat are at a minimum in the extended position, and said angle of divergency and the area of said throat are at a maximum in the retracted position, said downstream portion diverging in the retracted position, a fixed secondary diverging nozzle section surrounding and spaced from said primary section to define an ejector nozzle passage therebetween, said primary nozzle section discharging to ambient atmosphere in said extended position and discharging into said secondary nozzle section in said retracted position, said secondary nozzle section forming an extension of said primary nozzle section in the retracted position.

7. In an exhaust nozzle for a jet propulsion engine: an adjustable primary nozzle section receiving working fluid from said engine and formed successively, in the direction of working fluid flow therethrough, with a convergent portion, a divergent portion and a primary discharge orifice; a secondary nozzle section formed with a secondary discharge orifice and circumferentially spaced about said primary nozzle section to form a passage therebetween for supplying secondary air to said secondary nozzle section; and actuating means for selectively adjusting said primary nozzle section toward a first position in which said primary and said secondary discharge orifices lie in a single plane transverse to said direction of working fluid flow, and toward a second position in which said secondary nozzle section forms an extension of said primary nozzle section receiving said flow of working fluid therefrom.

8. An exhaust nozzle for a jet propulsion engine, comprising, in combination; a primary nozzle section for receiving working fluid from said engine and formed successively, in the direction of working fluid flow therethrough, with a convergent portion, a throat portion, and a divergent portion; a secondary divergent nozzle section; means supporting said primary nozzle section for movement to a first position in which said working fluid is exhausted to atmosphere directly from said primary nozzle section, and to a second position in which said working fluid is exhausted to atmosphere through said secondary nozzle section from said primary nozzle section; said supporting means constructed and arranged to adjust the cross-sectional area of said throat from a minimum in said first position to a maximum in said second position; whereby said secondary nozzle section forms a divergent extension of said divergent portion of said primary nozzle section in said second position.

References Cited in the file of this patent

UNITED STATES PATENTS

| | | |
|---|---|---|
| 2,603,062 | Weiler et al. | July 15, 1952 |
| 2,680,948 | Greene | June 15, 1956 |
| 2,770,944 | Jordan | Nov. 20, 1956 |
| 2,780,056 | Colley | Feb. 5, 1957 |
| 2,831,319 | Geary | Apr. 22, 1958 |
| 2,910,828 | Meyer | Nov. 3, 1959 |
| 2,972,226 | Geary | Feb. 21, 1961 |

FOREIGN PATENTS

| | | |
|---|---|---|
| 537,620 | Belgium | May 14, 1955 |
| 537,785 | Belgium | May 14, 1955 |
| 1,140,440 | France | Mar. 4, 1957 |
| 795,652 | Great Britain | May 28, 1958 |
| 796,291 | Great Britain | June 11, 1958 |